No Printed Specification Available
7766X
J. Bogardus.
Pencil Slide & Case.
No. Patented Sept. 17, 1833.
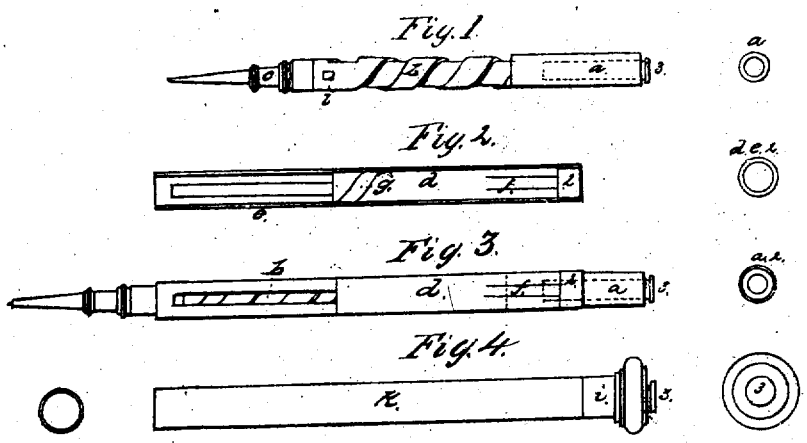

17767X [illegible] Sept. 17, 1833

James Bogardus.
Letters Patent. Patented Sept. 17. 1833. -

The Schedule referred to in these Letters Patent, and making part of the same, containing a description in the words of the said James Bogardus himself, of his improvements in the manufacture of metallic slides and cases for ever pointed and other pencils.

---

To all to whom these presents shall come.
Be it known that I, James Bogardus of the city and county of New York, in the State of New York, Mechanical Engineer, have invented a new and useful improvement in the manufacture of metallic slides and cases for ever pointed and other pencils, and that the following specification and the drawing sheets annexed contain a full and exact description and representation and construction and operation of the said improvements as invented by me.

Metal pencil cases are at present made with a slot in the side of the outer tube and an outside sliding collar is connected by a pin or pins to the inner sliding tube, [illegible] the outer tube is also weakened and the symmetry of the article is lessened by the slot.

The intent of the improvements for which a Patent is hereby claimed and specified is to remedy these defects. And the mode of effecting these objects is set forth in the following specification and in the drawing sheets annexed, wherein Fig. 1, represents a full sized longitudinal section of the innermost tube in three parts. Fig. 2. is a longitudinal section of the second tube in the three separate parts wherein it is required to be made. Fig. 3. is a similar section of the pencil when ready for use except the outer case. Fig. 4. shows the pencil finished and shut together for the pocket. There are also five circular sections of the parts and the same letters refer to the similar parts in all the figures.

a Fig 1 is the usual magazine piece for holding the leads.

7766X b, is a hollow cylinder the same size and joined on to c, which is the cylinder and point to hold the lead for use made in the usual and well known manner of making this part of ever pointed pencils. A coarse thread screw either direct or backhanded is cut on the cylinder b, as shewn in the fig. 1. which is backhanded as being considered most convenient. d. is a hollow cylinder of thin metal made so as that one end shall solder on to a, Fig. 1, leaving about one eighth of the circle at liberty which is cut longitudinally so as to form the tightening spring, f, At the opposite end of d, a plate of metal g, is lightly soldered in, which plate is twisted spirally so as to fill the internal diameter of d, and likewise form a female backhanded screw of the same make and dimensions as the backhanded male screw on b, e. is the continuation of the internal tube d, and has a slot nearly the whole length to allow the guide stud 1, on the screw cylinder b, to pass longitudinally in it, either way.

By this construction it will be seen that when a, is turned up as if turning a common screw, out, the point of the pencil will be projected out from cylinder e, and when the operation is reversed the point will be drawn inwards.

When thus far constructed the solid end of the cylinder e. is soldered to the outer end of the principal or outer metal tube h, fig. 3. and the small collar 2, being placed on the cylinder a, the other end of the principal or outer tube h. is soldered to it. By this means the internal works is kept accurately in place and yet allowed to turn freely within the internal tube h, for all required purposes the tightening spring f, retaining the cylinders in any position in which they may be placed.

The outer metal cylinder i, being soldered on a, and the thumb screw 3, fitted into the end of a. to secure the leads the whole will now present the appearance of a solid cylinder as in Fig. 4. and it is not liable to injury from wear or grit or from the outer cylinder being weakened by the slot as in the common way to allow of the pencil sliding in and out.

Believing this mode of operating to be new, I claim as my invention the application of the coarse thread screw either direct or backhanded and the general arrangement of the parts as herein described as my improvements in the manufacture of metallic slides and cases for ever pointed and other pencils. As witness my hand in the City and County of New York this fifth day of September 1833.

Witnesses.
W. Sewell.
Joseph Curtis

James Bogardus (Dra[illegible] portfolio)

(grounds)

[illegible]